United States Patent [19]
Bateman

[11] 3,936,796
[45] Feb. 3, 1976

[54] AIRCRAFT GROUND PROXIMITY WARNING INSTRUMENT

[75] Inventor: Charles Donald Bateman, Bellevue, Wash.

[73] Assignee: Sundstrand Data Control, Inc., Redmond, Wash.

[22] Filed: Jan. 27, 1975

[21] Appl. No.: 544,484

Related U.S. Application Data

[62] Division of Ser. No. 480,727, June 19, 1974.

[52] U.S. Cl. ...... 340/27 AT; 73/178 T; 235/150.22; 244/77 A; 343/77 A; 343/108 R; 343/112 A; 343/112 CA
[51] Int. Cl.² .......................................... G01C 5/00
[58] Field of Search ............... 73/178 R, 178 T, 179; 235/150.22, 150.2; 244/77 A, 77 D; 318/583; 340/27 R, 27 NA, 27 AT, 16 R, 16 C, 16 M, 27, 29, 52 H, 56, 62, 66, 74, 258; 343/7 TA, 112 CA, 5 LS, 7 R, 7 ED, 7 PF, 7.7, 8, 9, 12 R, 12 A, 108 R, 112 A, 5; 179/15 A

[56] References Cited
UNITED STATES PATENTS

| | | | |
|---|---|---|---|
| 2,702,342 | 2/1955 | Korman | 343/112 CA X |
| 2,735,081 | 2/1956 | Hosford | 340/27 R |
| 2,851,120 | 9/1958 | Fogiel | 343/112 CA X |
| 2,930,035 | 3/1960 | Altekruse | 343/7 TA |
| 2,931,221 | 4/1960 | Rusk | 73/179 |
| 3,210,760 | 10/1965 | Olson et al. | 343/7 TA |
| 3,245,076 | 4/1966 | LeTilly et al. | 343/7 TA |
| 3,248,728 | 4/1966 | Garfield et al. | 343/112 A X |
| 3,333,795 | 8/1967 | Hattendorf et al. | 235/150.22 X |
| 3,715,718 | 2/1973 | Astengo | 340/27 R |
| 3,766,518 | 10/1973 | Rillett | 340/7 TA X |

OTHER PUBLICATIONS

Brantley, James Q., Radar Offers Solution to Midair Plane Collisions, Electronics, 11-1954, pp. 146-150.

*Primary Examiner*—Duane A. Reger
*Assistant Examiner*—Stephen G. Kunin
*Attorney, Agent, or Firm*—Wegner, Stellman, McCord, Wiles & Wood

[57] ABSTRACT

An aircraft instrument for warning the pilot that the aircraft is in an unsafe condition in proximity to the ground. The instrument has inputs representing aircraft configuration, flight condition with respect to the ground, and glide slope. Detector circuits process the inputs and give a warning of unsafe proximity to the ground. The boundary conditions for the warning are selected to avoid false warnings. A glide slope detector distinguishes between a valid glide slope signal and spurious signals, without need for pilot input.

11 Claims, 10 Drawing Figures

| TEST SEQUENCE | | | | | |
|---|---|---|---|---|---|
| TEST | GROUND | | | | IN-FLIGHT |
| TEST SW POSITION | PRESSED | | | RELEASED | PRESSED |
| WARNING | ON 3 SEC | OFF 3 SEC | ON | ON 2 SEC | ON |
| WARNING LOGIC CHECKED | CLOSURE WARNING | RECOVERY | NEGATIVE CLIMB WARNING | SINK RATE WARNING | OUTPUT LOGIC |

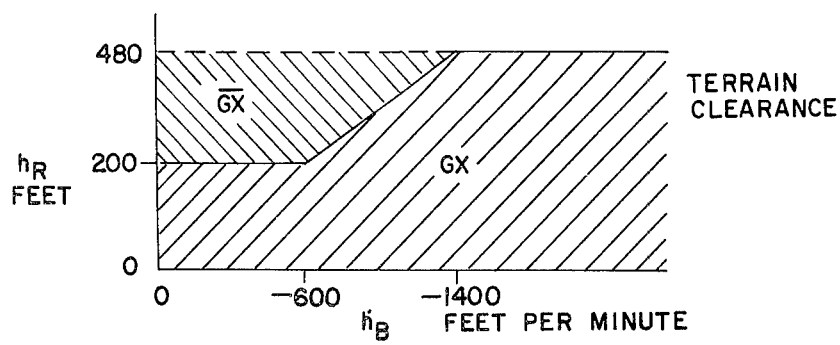
FIG. 5
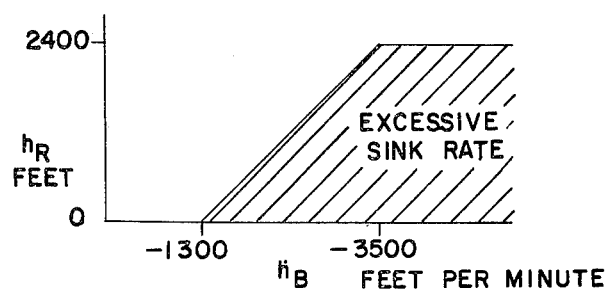
FIG. 6
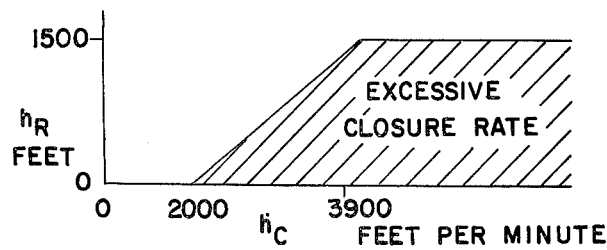
FIG. 7
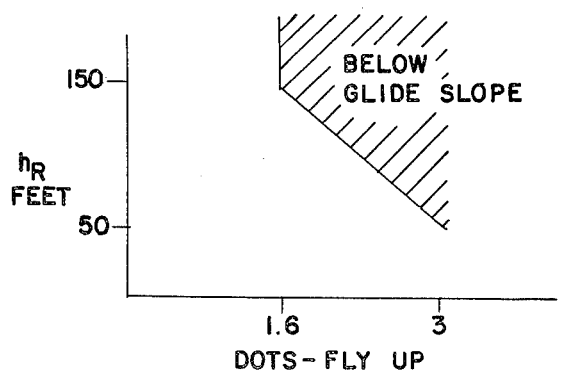
FIG. 8
FIG. 9
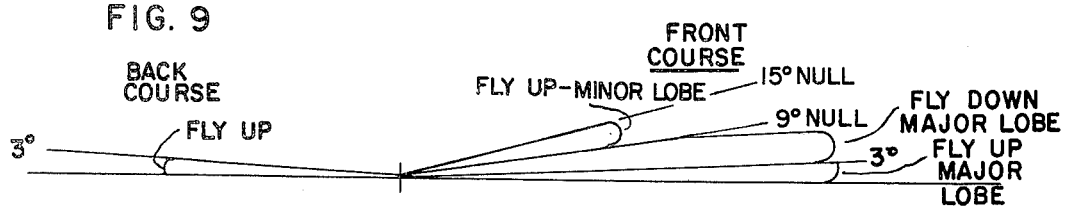

AIRCRAFT GROUND PROXIMITY WARNING INSTRUMENT

This application is a division of my copending application Ser. No. 480,727, filed June 19, 1974, entitled "Aircraft Ground Proximity Warning Instrument."

This invention relates to an aircraft ground proximity warning instrument.

Analysis of aircraft accidents on takeoff and landing show that many occur as a result of the aircraft being operated in an unsafe condition in close proximity to the ground. Astengo U.S. Pat. No. 3,715,718, issued Feb. 6, 1973, to the assignee of this application, discloses and claims a ground proximity warning instrument which provides a pilot warning signal when the closure rate of the aircraft with respect to the ground is excessive for the altitude of the aircraft above the ground. I have found that the safety of aircraft operation may further be enhanced by the provision of warnings based on other aircraft conditions. It is, however, as important that false warnings be avoided as that warnings be given of unsafe conditions, for many pilots would ignore completely an instrument which was found to give false warnings. This invention concerns various aspects of the instrument which extend the scope of the conditions for which warnings are given and enhance the reliability of the operation.

One feature of the invention is that the instrument includes a means for generating a signal representing a deviation of the aircraft from the glide slope together with means for comparing the glide slope deviation signal with a signal representing the altitude of the aircraft with respect to the ground and for giving a warning when the deviation is excessive.

Another feature of the invention is the provision of means responsive to the signal representing the deviation of the aircraft from the glide slope for determining whether the glide slope signal is valid or spurious. More particularly, the radiation pattern for a glide slope antenna normally includes both the intended glide slope beam and unintended or spurious beams at other angles. The electrical characteristics of the received signal are utilized to distinguish between the valid and spurious signals, without requiring pilot input.

In a prior instrument, a warning was given to the pilot on the occurrence of descent of the aircraft below a predetermined altitude with respect to the ground, if the aircraft landing gear and flaps were not in the landing configuration. There are some airports which require a low level turning approach which is best executed without having the aircraft in landing configuration. A further feature is the provision of means for inhibiting the warning during such an approach.

Yet another feature is the provision of improved circuitry for inhibiting the giving of a warning during the final stages of a descent to landing and the initial stages of a takeoff.

Still a further feature is the provision of circuitry for eliminating a false warning caused by disturbance in the input signals resulting from switching transients in the electrical power system of the aircraft, or the like.

Further features and advantages of the invention will readily be apparent from the following specification and from the drawings, in which:

FIG. 1 is a diagram illustrating the general configuration of the instrument;

FIGS. 2, 3, and 4 together make up a functional block diagram of the instrument;

FIGS. 5–8 are curves of the warning condition detector characteristics;

FIG. 9 is a diagram illustrating a typical glide slope radio beam; and

The instrument illustrated and described herein incorporates not only the novel features summarized above and defined particularly in the claims, but also includes warning condition detection circuitry based on Astengo U.S. Pat. No. 3,715,718 and on a previous instrument which has been marketed for more than one year. The entire instrument is illustrated in order that the interrelationship of the various warning conditions will be clear. The novel subject matter is defined in the claims.

During the course of the description of the invention, specific values will be given for various warning boundary conditions, as altitudes, altitude rates, signal frequencies and the like. They represent nominal values for optimum warning conditions which have been found to be applicable to a variety of commercial jet aircraft for operation at airports throughout the world. It will be understood that these values in the specification and claims are subject to reasonable tolerances. Many of the signals and conditions are represented by symbols. The symbols used most often are identified and defined in the following table.

DEFINITION OF TERMS AND UNITS

| Symbol | Definition |
|---|---|
| $(-) \cdot (-)$ | The logic "AND" connective |
| $(-) + (-)$ | The logic "OR" connective |
| $h_R$ | Radio altitude in feet |
| $\dot{h}_R$ | Radio altitude rate in feet per minute |
| $h_B$ | Barometric altitude in feet |
| $\dot{h}_B$ | Barometric altitude rate in feet per minute |
| FD | Flaps in landing position. This also includes the case where the signal is (flaps down or gear down). |
| $\overline{FD}$ | Flaps not in landing position (i.e., logic inversion symbol) |
| $\dot{h}_c$ | Complemented closure rate in feet per minute (as described in Astengo patent 3,715,718) |
| GU | Gear up signal |
| $\overline{GU}$ | The inversion of gear up, meaning gear down. |
| $\dot{h}_{RL}$ | Radio altitude rate limit as described in Astengo 3,715,718. |
| TO | Stands for take off and is the output of a memory cell as indicated. |
| $\overline{TO}$ | The logic inversion of the TO signal. |
| TC | Below Terrain Clearance minimum. |
| $\overline{TC}$ | Above Terrain Clearance minimum. |
| Front course | Discrete input signal |
| G/S | Glide Slope deviation input signal in "dots" (one dot = .35° deviation). |
| $\dot{G/S}$ | Rate of change of the glide slope deviation signal. |
| (G/S Valid) | Validity signal developed from G/S signal indicating a proper G/S signal is being received. |
| GX | A Gear related signal which is output of a memory cell as indicated. |
| $\overline{GX}$ | The logic inversion of GX. |

Figures 1, 10:
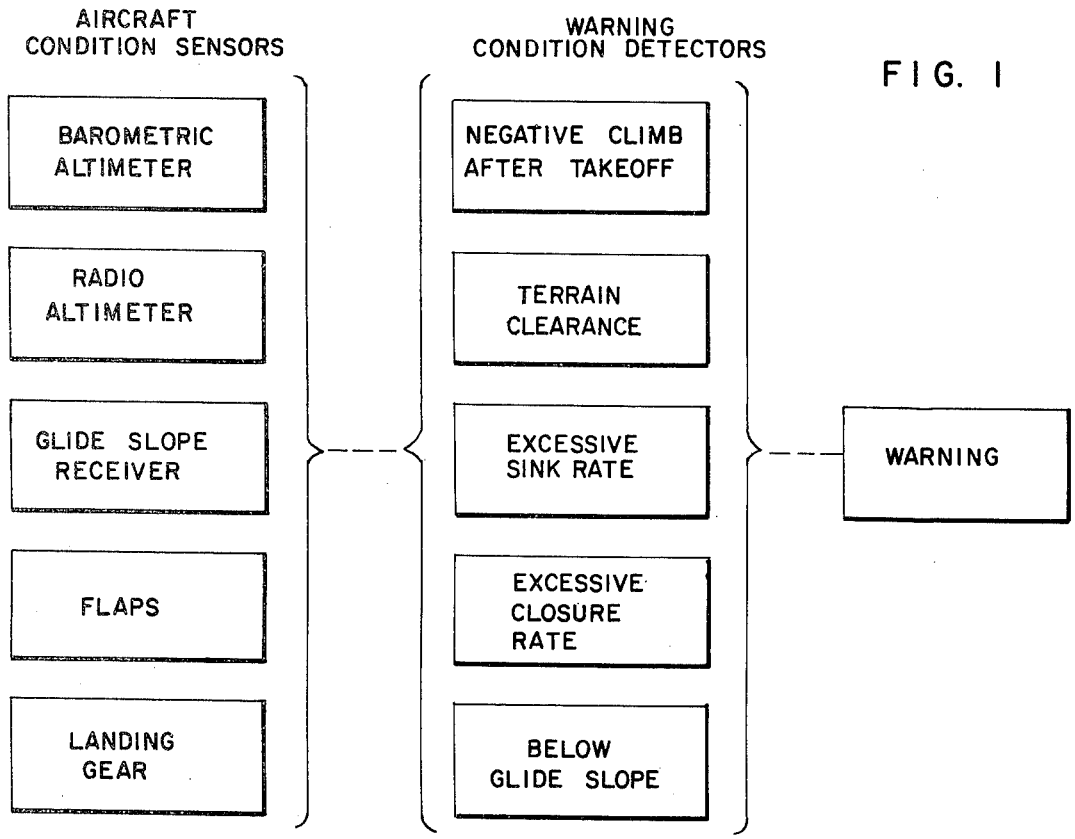
FIG. 10 is a chart summarizing the self-test sequence of the instrument.

The basic concept of the instrument is illustrated in FIG. 1. Signals from several aircraft condition sensors are connected with several warning condition detectors which, in an unsafe condition of the aircraft, generate a signal which actuates a warning.

Some of the aircraft conditions sensors are concerned with the position and movement of the aircraft while others are concerned with its physical characteristics. The barometric altimeter measures the aircraft altitude with respect to sea level, sensing changes in atmospheric pressure. The radio altimeter measures the clearance of the aircraft from the ground, based on the transit time of a radio signal from the aircraft to the ground and back. The glide slope receiver provides an input to the instrument at airports which are equipped with a glide slope radio beam. The flaps and landing gear sensors detect whether the wing flaps and landing gear are retracted or extended.

The warning condition detectors can be categorized functionally in terms of the conditions which they detect. The "negative climb after take off" detector gives a warning when the aircraft descends after it has left the ground on take off. The "terrain clearance" detector monitors the approach of the aircraft to the ground and gives a warning when it approaches too closely and is not in a proper configuration for landing. The "excessive sink rate" detector gives a warning when the aircraft is descending too rapidly. The "excessive closure rate detector" (based on the Astengo patent) gives a warning when the aircraft approaches the ground too rapidly. The "below-glide slope" detector generates a warning when the glide slope deviation is excessive for the altitude.

The warning which is given may be visual or audio in nature. Preferably it is an audio signal repeatedly admonishing the pilot to "pull up".

Figure 2:
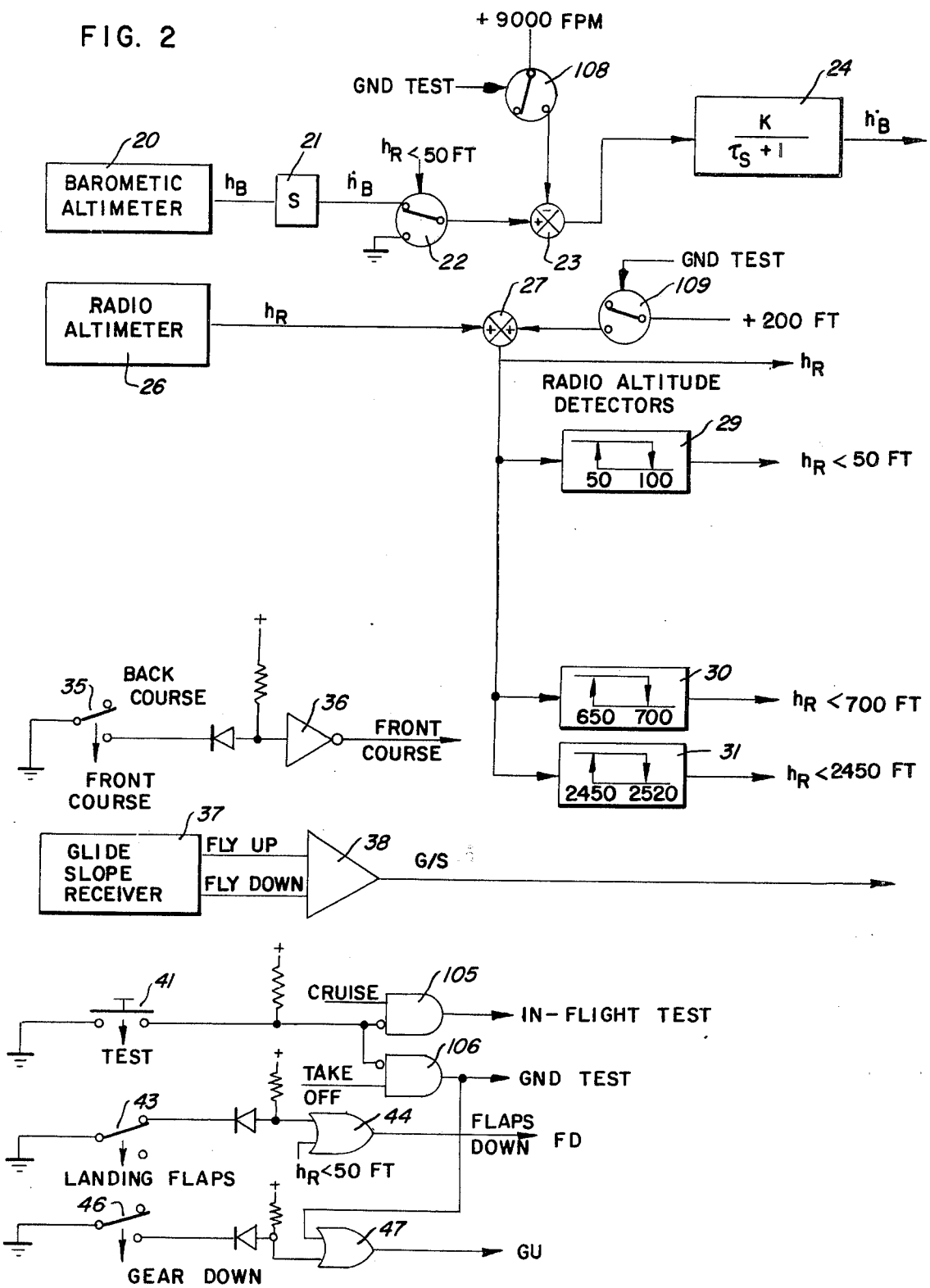
Figure 3:
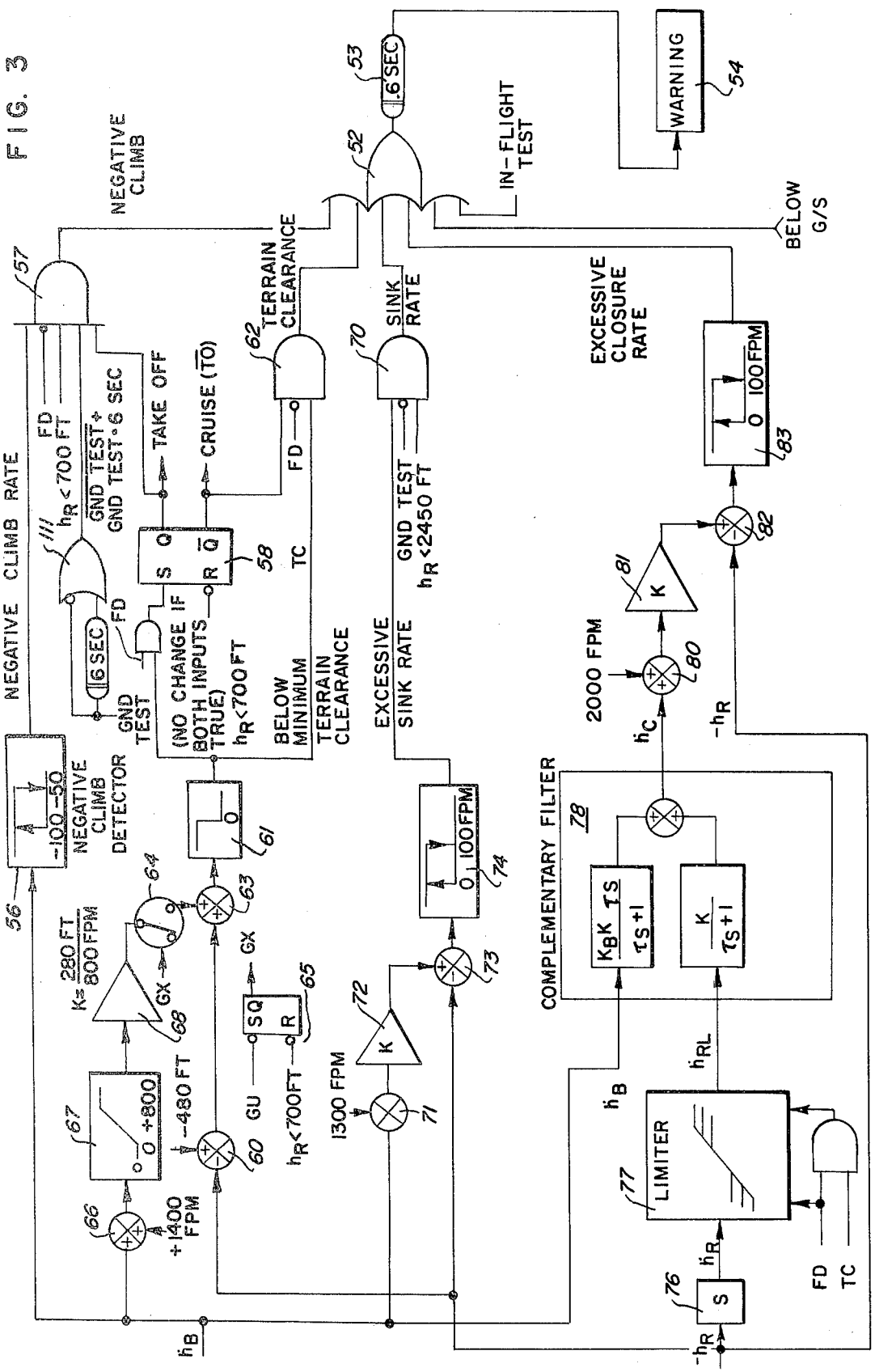
Figure 4:
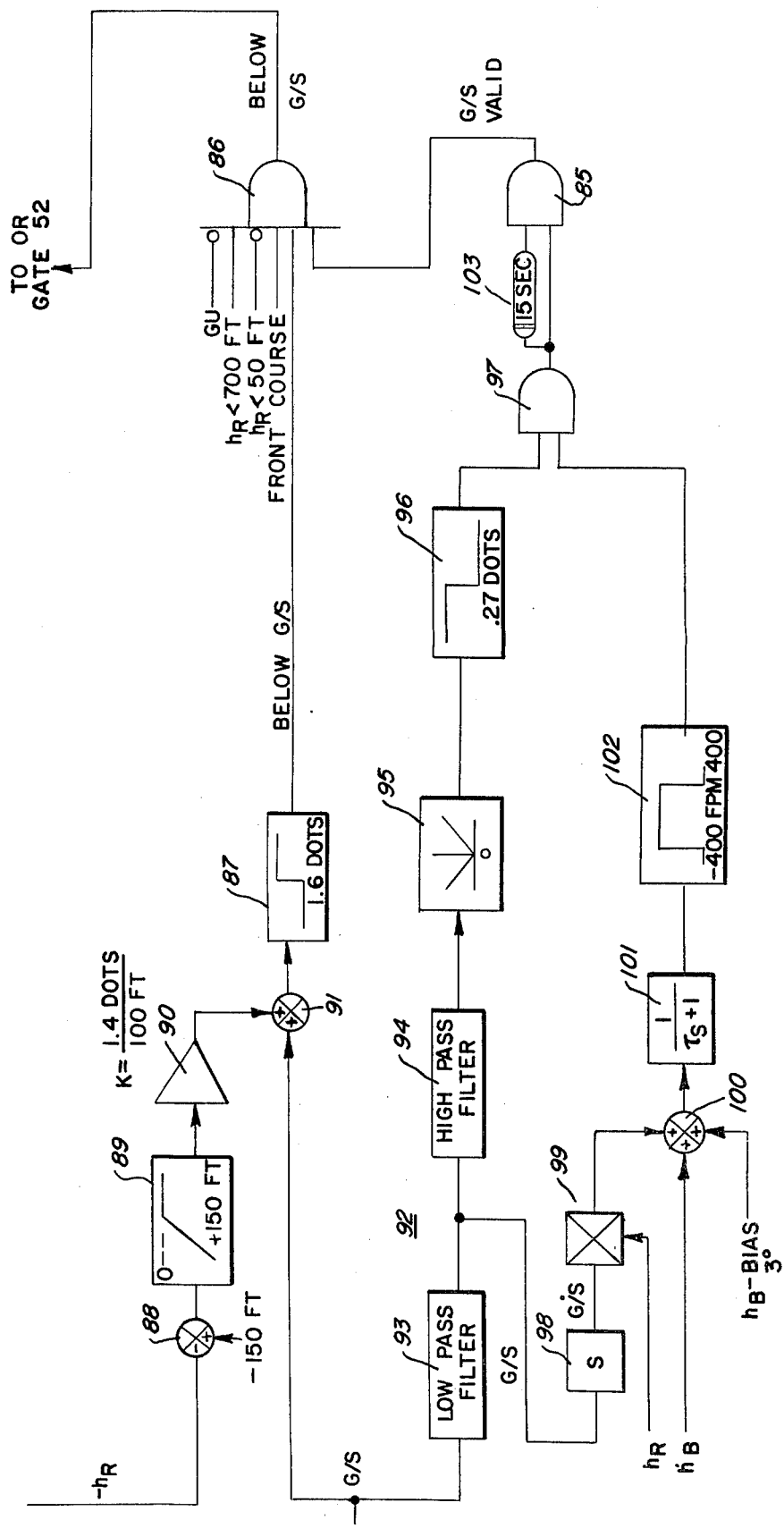

The aircraft condition sensors and some of the signal processing are shown in more detail in FIG. 2, which together with FIGS. 3 and 4 illustrate diagrammatically the circuitry of the instrument. Barometric altimeter 20 has an analogue output signal $h_B$ connected with a differentiator circuit, the output of which is an analogue barometric altitude rate signal $\dot{h}_B$. This signal is connected through a low altitude disabling switch 22 and a test summing junction 23 with a filter 24. In aircraft equipped with an air data computer, the barometric altitude signal $h_B$ may be provided by the computer rather than the barometric altitude.

The radio altimeter 26 has an analogue output signal $h_R$ connected with a test summing junction 27 and providing another input to the detector circuitry. In addition, $h_R$ is an input to a plurality of discrete radio altitude detectors providing logic signals at different altitudes of the aircraft above the ground. For example, altitude detector 29 determines whether the aircraft is above or below a 50 foot altitude, as the aircraft is descending. When $h_R$ becomes less than 50 feet, the output of detector 29 is a logic 1. As the aircraft ascends, the output of detector 29 becomes a logic 0 when the altitude exceeds 100 feet. The 50 foot differential or hysteresis in the detector switching characteristic prevents a change in condition of detector output unless there is a significant change in the aircraft altitude. Altitude detectors 30 and 31 provide logic 1 outputs at radio altitudes below 700 feet and 2450 feet, respectively.

Some aircraft are provided with a pilot control for the aircraft localizer receiver which enables use on the back course of the localizer radio beam. Where such selection is available, it is also utilized in the ground proximity warning instrument to provide a logic enabling input to the glide slope detector, as will appear later. The course selector switch 35 in the "front course" position, grounds the input of inverter amplifier 36, providing a logic 1 output. With switch 35 in the "back course" position, the output of amplifier 36 is a logic 0.

Glide slope receiver 37 has outputs representing "fly up" and "fly down" conditions, connected with amplifier 38, the output of which is an analogue signal with a positive polarity for "fly up" and a negative polarity for "fly down". The nature of the glide slope radio beam and the glide slope signal will be discussed in more detail below.

Self test circuitry is actuated by closure of switch 41 exercising various circuits of the instrument to determine whether they are operative. Details of the test circuitry and its operation will be discussed below.

Switch 43 opens when the aircraft flaps are extended to landing position providing a logic 1 input to OR gate 44. Another input to OR gate 44 is $h_R < 50$ feet.

Landing gear sensing switch 46 closes with the landing gear down or in extended position, and completes a circuit to ground, grounding the input of OR gate 47. The other input to OR gate 47 is derived from the test circuit. The output of OR gate 47 is a gear up signal GU.

The analogue and logic signals developed in FIG. 2 are utilized in the circuits of FIGS. 3 and 4 to generate a warning signal under conditions of unsafe aircraft operation. The several detector circuits which will be described in detail have logic outputs connected with OR gate 52 (FIG. 3) the output of which is connected through a time delay 53 with a pilot warning 54.

Considering first the detection of a negative climb following takeoff, it will be seen that the barometric rate signal $\dot{h}_B$ is connected with a negative climb detector 56 which has a logic 1 output when the negative climb (descent) exceeds 100 feet per minute. This signal is one of the inputs of AND gate 57. The other inputs of AND gate 57 are inverted FD, $h_R < 700$ feet and a takeoff signal from a memory unit 58. A remaining input is concerned with the test circuit and will be described later; it is a logic 1 except under test conditions. Accordingly, when the aircraft is taken off, has flaps up and before it reaches an altitude of 700 feet, if there is a negative climb rate in excess of 100 feet per minute, a warning signal is given.

The second warning condition detector is concerned with descent of the aircraft below a minimum terrain clearance which is related to aircraft configuration. Radio altitude $h_R$ is summed with a bias signal representing $-480$ feet at summing junction 60. Detector 61 determines when the difference is less than 0 and has a logic 1 output when the aircraft is below 480 feet. This signal is an input to AND gate 62. The other inputs for the AND gate are the Cruise or $\overline{TO}$ output of memory unit 58 and an inverted flap down or FD signal. The cruise descent detector gives a warning when the aircraft altitude with respect to the ground is less than 480 feet and the aircraft is not in the configuration for landing.

At this point it is significant to consider the operation of memory unit 58 and the input conditions which are required for the Takeoff and Cruise outputs. Memory unit 58 is a bistable flip-flop having set and reset inputs S and R, respectively, and Q and $\overline{Q}$ outputs representing Takeoff and Cruise, respectively. The S input of the flip-flop is flaps down FD and below minimum terrain clearance TC while the R input is an inversion of $h_R < 700$ feet. When the aircraft is in flight, S is 0 and R is 1. The output is $\overline{Q}$ or Cruise. As the aircraft descends, the R input goes to 0 when $h_R$ is less than 700 feet. This causes no change in the output of the memory unit. The S input goes to 1 when the aircraft flaps are down and the aircraft is below minimum terrain clearance TC. The memory unit switches condition and has a Q or Takeoff output and remains in this condition even if power is removed from the instrument. In this respect it is analogous to a latching relay. The S input remains 1 until the flaps are retracted. S then drops to 0 with no change in the output of the memory unit as the R input is still 0. When $h_R$ exceeds 700 feet, the R input is 1 and the memory unit switches to a $\overline{Q}$ or Cruise output.

The cruise descent circuit provides a warning signal when the aircraft is below 480 feet and does not have the flaps in landing configuration. There are airports where the terrain requires a low circling approach at an altitude below 480 feet. It is undesirable to make such an approach with flaps extended as the drag with both the landing gear down and the flaps extended is too great to accomplish a low level turn with an adequate margin of safety. Visual approaches are sometimes made underneath a low overcast. Again, the landing gear may be down although the flaps are not in landing position. The cruise descent circuitry provides a warning inhibit circuit which permits such an approach.

The warning detector 61 provides a warning signal when $h_R$ goes below 480 feet. An inhibit signal is added to the input of detector 61 at summing junction 63 when switch 64 is closed by the landing gear related signal GX from memory unit 65. The GX signal is obtained from the Q output of the bistable flip-flop memory unit having an S input of inverted GU and an R input of inverted $h_R < 700$ feet. When the aircraft is in flight, S is 0 and R is 1. There is no Q output. The R input goes to 0 when the aircraft descends below 700 feet. When the landing gear is lowered, the S output goes to 1 and the memory unit has a GX output at Q. This output remains, even if the landing gear is retracted, until the aircraft is again above 700 feet.

The inhibit signal is derived from the barometric rate signal, preventing the occurrence of a warning so long as descent is not excessive, between altitudes of 480 and 200 feet. The characteristic of the inhibit signal is illustrated by the solid line boundary in FIG. 5. The barometric altitude rate signal $\dot{h}_B$ is summed with a bias signal representing an ascent of 1400 feet per minute at summing junction 66. A limiting circuit 67 is cut off with an input signal level representing 0 feet per minute and saturates at +800 feet per minute. These represent barometric descent rates of 1400 and 600 feet per minute, respectively. The output of limiter 67 is connected with amplifier 68 having a gain such that for $\dot{h}_B$ of −1400 feet per minute, the inhibit signal is 0 and for $\dot{h}_B$ of −600 feet per minute, the inhibit signal corresponds with the output of summing junction 60 for $h_R$ of 200 feet. The resulting signal is summed with $h_R$ − 480 feet at summing junction 63.

Considering the circuit and the diagram of FIG. 5, it will be seen that with the landing gear up, a warning signal is given when the aircraft goes below 480 feet. This is represented by the broken and solid line boundary at 480 feet in FIG. 5. With the gear down, the warning inhibit signal based on $\dot{h}_B$ is added and the solid line in FIG. 5 represents the warning boundary.

Below an altitude of 480 feet, so long as the descent rate is not excessive, a positive signal at the output of amplifier 68 inhibits a warning. As the aircraft descends below 480 feet the negative input to summing junction 63 from summing junction 60 becomes greater and the negative climb rate which may be tolerated without a warning diminishes from 1400 to 600 feet per minute. Below an altitude of 200 feet there is no inhibit signal, and with the aircraft not in landing configuration, a warning is given.

If the pilot should for some reason retract the landing gear after descending below 480 feet, as to execute a Go Around maneuver, it is desirable that a warning not be given. The GX output of memory unit 65 remains until the aircraft climbs above 700 feet, keeping switch 64 closed. Even with the gear up, so long as the aircraft descent rate $\dot{h}_B$ does not exceed the solid line boundary of FIG. 5, a Terrain Clearance warning is not given.

The excessive sink rate detector will be described in conjunction with the characteristic diagram of FIG. 6 and the inputs to AND gate 70. The sink rate detector has inputs of barometric rate $\dot{h}_B$ and radio altitude $h_R$. $\dot{h}_B$ is summed with a signal representing 1300 feet per minute at summing junction 71. The output is amplified at 72 and connected with junction 73 where it is summed with the radio altitude signal $h_R$. Detector 74 has a logic 1 output when its input is less than 0 and provides one of the inputs for AND gate 70. The other input is $h_R < 2400$ feet warning is given if the sink rate is excessive. At 2400 feet a sink rate of 3500 FPM is tolerated. At $h_R = 0$ a sink rate of 1300 FPM is tolerated without warning. The intercept at $h_B - 1300$ FPM is established by the 1300 FPM bias added at summing junction 71 and the tolerated sink rate at 2400 feet is determined by the gain of amplifier 72.

The closure rate detector is based on the circuitry disclosed and claimed in Astengo U.S. Pat. No. 3,715,718 in which a complemented altitude rate signal $\dot{h}_C$ is compared with the aircraft altitude to establish a warning criteria. The circuitry will be described briefly here. Additional details may be found in the Astengo patent. The warning boundary is illustrated diagrammatically in FIG. 7.

An altitude rate signal $\dot{h}_R$ is derived from $h_R$ through differentiator 76. This signal is connected with a variable level limiter 77 and the limited altitude rate signal $\dot{h}_{RL}$ provides one of the inputs to complementary filter 78. The other input is barometric altitude rate $\dot{h}_B$. The limits for $\dot{h}_R$ are determined in accordance with the configuration of the aircraft and the aircraft altitude. The widest set of limits is provided when the aircraft has flaps up. An intermediate set of limits is used when flaps are down and a narrow set is used when a below minumum terrain clearance conditions exists. The narrow limits with FD and TC effectively disables the closure rate warning during the final stages of a landing approach.

The complemented altitude rate signal $\dot{h}_C$ is summed with a bias signal representing an ascent of 2000 feet per minute at summing junction 80, scaled in amplifier 81 and summed with the radio altitude $h_R$ at junction 82. A detector 83 provides a logic 1 warning output when the sum is less than 0. The circuit has a straight line warning characteristic between conditions of a complemented altitude rate of 2000 feet per minute at 0 altitude and 3900 feet per minute at 1500 feet altitude. In this repect the circuit differs from that described in the Astengo patent where the warning boundary has a square function. The output of detector 83 is connected as one of the inputs of OR gate 52.

The below glide slope detector and the glide slope validity circuitry are shown in FIG. 4. The detector warning characteristic is illustrated diagrammatically in FIG. 8.

Assuming first that a valid glide slope signal is received and there is a logic 1 output from AND gate 85 to the AND gate 86, the additional requirements for the operation of the glide slope circuitry will be considered. AND gate 86 has other logic inputs representing inverted Gear Up, 50 feet $<h_R<$ 700 feet and a front course input which will be described later. The below glide slope detector has inputs from the glide slope receiver 37 and aircraft altitude $h_R$. The glide slope deviation signal from receiver 37 is positive for a fly up condition and has an amplitude represented in terms of dots. This corresponds with the typical glide slope display in which a pointer associated with the field of dots gives a three dot indication for a maximum fly up or fly down condition. At altitudes above 150 feet, a below glide slope deviation signal in excess of 1.6 dots gives a logic 1 output from detector 87 to AND gate 86 providing a warning signal.

The glide slope deviation signal is based on the angle between the glide slope and a line from the aircraft to the glide slope antenna. Thus, close to the glide slope antenna, generally at very low altitudes, a small vertical displacement of the aircraft from the glide slope represents a large angular displacement. To avoid false warnings, the sensitivity of the below glide slope detector is reduced at low altitude. The altitude signal $h_R$ is added to a $-150$ feet bias signal at summing junction 88. Limiter 89 has a 0 output for altitudes above 150 feet and a negative output at altitudes below 150 feet. This signal is connected with scaling amplifier 90, the output of which is summed with the glide slope deviation signal at junction 91. The characteristic of the detector circuit, FIG. 8, shows that at altitudes above 150 feet a warning is given with a glide slope deviation signal of 1.6 dots or greater. For altitudes between 150 feet and 50 feet, the sensitivity is reduced so that a deviation from the glide slope of three dots is required at 50 feet to establish a warning condition. At altitudes below 50 feet, AND gate 86 loses an input and a glide slope warning is inhibited.

Some aircraft are provided with a localizer receiver capable of operation from either the front course or back course of the localizer radio signal. Such aircraft have provision for a pilot selection of the front course or back course condition. When the instrument is utilized in an aircraft of this character, AND gate 86 has a front course input provided by pilot operated switch 35 and inverter 36. In aircraft which do not have this pilot selection, the front course input of AND gate 86 is eliminated.

An important consideration in utilizing the glide slope deviation signal to provide a warning is insuring that a valid glide slope signal is received so that a false warning is not generated by a spurious glide slope signal. In the usual glide slope installation modulated radio beams are propogated from an antenna array adjacent the end of the runway along a 3° glide path to the antenna. Although it is desired that the radio beam energy be concentrated in the approach path of the aircraft, the radiation pattern in reality is generally conical. Most of the beam power is concentrated in the approach path or front course, but a significant portion of the energy is at 180° thereto in the back course. Lesser beam strength is generated along other vectors. Furthermore, all of the radiated energy is not in the beams along the 3° glide slope, but there are significant minor lobes radiated at other angles. Some of these conditions are illustrated diagrammatically in FIG. 9. In the front course there are nulls of 3°, 9° and 15°. The Fly Up major lobe is below 3° and the Fly Down major lobe is above 3°, centered on a 6° slope. Above the 9° null is a Fly Up minor lobe centered on 12°. Lesser lobes are sometimes found at higher angles. There is a similar radiation pattern in the back course but with lower signal energy.

If the aircraft flies through the back course or a minor lobe pattern, an unwarranted warning signal might be generated. In order that the glide slope warning system be effective, it must discriminate between valid and spurious glide slope deviation signals without pilot action (except for the front course/back course switch 35, discussed above).

Two different characteristics of the glide slope deviation signal are relied on to establish validity. Both are related to changes of the valid and spurious fly up and fly down information. The changes in the spurious information are greater than those in the valid information and this characteristic is utilized to distinguish between the two. The difference in the changes come about for several reasons.

Considering first the back course signal on a vector 180° to the front course, it will be appreciated that the antenna array is designed to minimize the power radiated along this vector. As a result the signal to noise ratio is greater in the front course signal than in the back course signal. Furthermore, the radiation pattern is dependent on ground reflection. In order to maximize the usefulness of the front course signal, efforts are made to keep the ground along the front course as clean of noise producing obstructions as possible. Generally aircraft and motor traffic are prohibited. Conversely, in the back course there is a great deal of traffic causing distrubances in the signal. Thus, in the front course not only is the signal stronger, but the noise is less than in the back course. Similarly, in the minor Fly Up lobe at 12°, the signal to noise ratio is reduced. Furthermore, if the aircraft is following a course approximating a 3° glide slope, its path makes an angle of 9° with respect to the 12° secondary lobe. This results in a very rapid change in amplitude of the glide slope deviation signal. These are examples of the signal characteristics utilized to establish validity of the glide slope signal.

Two validity detector circuits respond to the glide slope deviation signal. If either has an output it indicates that the information is spurious and the glide slope signal is not valid.

The glide slope deviation signal G/S, or Fly Up/Fly Down information, is connected with a bandpass filter 92 made up of serially connected low pass and high pass filter sections 93 and 94 respectively. The output of filter 92 is connected with a rectifier 95 that has a DC output which is a function of the signal energy passed by the filter. When the output of rectifier 95 exceeds a level corresponding with 0.27 dots of glide slope deviation signal, the output of warning detector 96 goes to zero and removes an input of AND gate 97. Valid Fly UP/Fly Down signal information generally has a frequency less than one-fourth Hz. Invalid information has a higher frequency both because the signals in the back course and the minor lobes are noisy and unstable and because the signal will change rapidly in amplitude if it is derived from a minor lobe. If there is significant signal strength above one-fourth Hz., it is passed by filter 92 and inhibits a warning from the glide slope detector. In order that operation of the circuit not be inhibited by higher frequency noise signals, low pass filter 93 has an upper cut off frequency of 2½ Hz. High pass filter 94 has a lower cutoff frequency of one-fourth Hz. so that the validity circuit does not respond to valid signal information.

If the glide slope receiver 37 has a good automatic gain control characteristic, changes in the glide slope deviation signal resulting from disturbances in the field strength of the radio pattern are minimized. A second glide slope detector circuit provides a further validity measure. The glide slope deviation signal from low pass filter 93 is connected with a differentiator circuit 98, the output of which represents the rate of change of the glide slope deviation signal G/S. This signal is multiplied by $h_R$ in variable gain amplifier 99 and connected to summing junction 100 where it is combined with signal representing the barometric rate $\dot{h}_B$ and a bias signal representing a barometric rate of −3°. The sum signal is filtered at 101 and connected with a glide slope deviation rate detector 102.

If the aircraft is in the major lobe and is flying along a path parallel with the 3° glide slope, $\dot{h}_B$ and the −3° bias signals cancel. If the plane is in the major lobe of the glide slope pattern, the rate of change of the glide slope signal should be 0 and in this condition detector 102 has a logic 1 output. If the plane is not on a path parallel with the glide slope, the glide slope deviation rate signal and the barometric rate signal cancel retaining a valid output from detector 99. If, however, there is a large change in the glide slope deviation signal, indicating that the plane is in a secondary lobe of the radiation pattern, detector 99 has a logic 0 output and a glide slope warning is inhibited. The gain of amplifier 99 is reduced at low altitudes by the $h_R$ input to reduce the sensitivity of rate detector 102 at low altitudes.

The logic outputs of the two glide slope validity detectors are connected with the inputs of AND gate 97 and provide an output from the AND gate so long as a valid signal is received. The output of AND gate 97 is connected directly and through a 15 second time delay 103 with the inputs of AND gate 85. This circuit requires that there be a 15 second valid glide slope deviation signal received before AND gate 85 has an output providing an enabling input to glide slope warning AND gate 86. If there is a determination of invalidity of the glide slope deviation signal, the glide slope warning is inhibited immediately. Another 15 seconds of valid glide slope deviation signal is required to reenable the glide slope warning.

The barometric altitude signal is not reliable close to the ground as air is compressed in front of and below the aircraft body and wings. The barometric altimeter senses the increased pressure of the air and indicates a lower altitude. Altitude detector 29 provides a logic output at altitudes less than 50 feet. Switch 22 is actuated at altitudes below 50 feet grounding the input of the barometric rate channel so that erroneous barometric altitude information does not cause a false warning. The logic signal is an inverted input to AND gate 86, inhibiting a glide slope warning below 50 feet.

The following tabulation of logical statements summarizes the warning conditions for the circuits of FIGS. 2, 3 and 4.

| WARNING CONDITION DETECTOR | WARNING CRITERIA |
|---|---|
| Negative Climb After Takeoff | $(\dot{h}_B<-100) \cdot \text{TO} \cdot \overline{\text{FD}} \cdot \underbrace{[(h_R \gtrsim 50) + (h_R>100)]}_{\text{Descent\quad Ascent}} \cdot (h_R<700)$ <br> Hysteresis <br> Where (TO) = state of memory unit 58 |
| Terrain Clearance | $\text{TC} \cdot \overline{\text{FD}} \cdot \overline{\text{TO}}$ <br> $\text{TC} = [(h_R<480) \cdot \overline{\text{TO}} \cdot \overline{\text{GX}}] + \left\{\left[h_R < \frac{280}{800}(-\dot{h}_R+160)\right] \cdot \overline{\text{TO}} \cdot \overline{\text{GX}} \cdot (h_R<480)\right\} +$ <br> $[(h_R<200) \cdot \overline{\text{TO}} \cdot \text{GX}]$ <br> where (GX) = state of memory unit 65 |
| Excessive Sink Rate Close to Terrain | $\left[h_R < \frac{2450}{2200}(\dot{h}_R-1300)\right] \cdot (h_R<2450) \cdot \underbrace{[(h_R>50) + (h_R>100]}_{\text{Descent\quad Ascent}}$ <br> Hysteresis |
| Excessive Closure Rate to Terrain | $\left[h_R < \frac{1500}{1900}(\dot{h}_c-2000)\right] \cdot (h_R>50)$ |
| Below Glide Slope | $\left\{\left[G/S < \frac{3}{214.3}(h_R-264.3)\right] \cdot (\text{Front Course}) \cdot (\text{G/S Valid}) \cdot \overline{\text{GU}} \cdot (50<h_R<150)\right\} +$ <br> $[(G/S<-1.6) \cdot (\text{Front Course}) \cdot (\text{G/S Valid}) \cdot \overline{\text{GU}} \cdot (150<h_R<700)]$ |

The various signal inputs to the instrument are electrical in nature and are derived from aircraft condition sensors which are electrically powered from the aircraft electrical supply. During normal operation of the aircraft it is not uncommon that transients occur on the power circuitry as a result of bus switching, for example. These transients are typically of very short time duration. However, they could disturb the condition sensors sufficiently to generate a false warning signal. The time delay circuit 53 connected between OR gate 52 and warning 54 eliminates false warnings from such transients. It has been found that a time delay of the order of 0.6 second is sufficiently longer than the power line transients to avoid false warnings while not unduly delaying the generating of a true warning.

In order that the operability of the instrument may be checked from time to time, a test circuit is provided which may be actuated by closing test switch 41. The tests performed depend on the aircraft conditions. When the aircraft is on the ground, several circuits are automatically actuated in sequence. When the plane is airborne, only the warning or output circuitry is tested. Closure of test switch 41 grounds inverting inputs of AND gates 105 and 106. The other input for AND gate 105 is a cruise output of memory unit 58 and the other input of AND gate 106 is a takeoff output from the memory unit. The tests performed are summarized in the table of FIG. 10.

The ground tests will be considered first. The output from AND gate 106 actuates switches 108, applying a bias signal representing a barometric descent rate of 9000 feet per minute to summing junction 23, and switch 109, applying a bias signal representing an altitude of 200 feet to summing junction 27. The 200 foot altitude signal removes the output from the 50 foot altitude detector 29. This causes switch 22 to return to the position shown in FIG. 2, removing the ground from the input of the barometric rate circuit.

The 9000 FPM bias to the barometric rate circuit charges the components of the complementary filter 78 generating a closure rate warning output for approximately 3 seconds. There is also a warning output from detector 74 of the sink rate circuit. However, a ground test signal is connected through an inverting input with AND gate 70 so that the sink rate warning is not connected to OR gate 52 during the initial portion of the test.

Similarly, the 9000 FPM barometric rate signal provides an output from detector 56 in the negative climb rate circuit. AND gate 57 in this circuit requires an input from OR gate 111 which is removed for six seconds at the start of the test sequence. The ground test signal is connected to an inverting input and through a 6 second time delay with OR gate 111. In the absence of ground test, OR gate 111 has a logic 1 output. At the start of the ground test, the output goes to 0. After the 6 seconds expires, the output returns to 1 and a warning is provided through AND gate 57. This warning continues so long as test button 41 is closed. When the test button is released, the inverted ground test input is removed from AND gate 70 and the warning continues through the sink rate circuit until any change from the bias signal in the barometric rate filter 24 or the sink rate detector circuit is dissipated.

When the test is carried out with memory unit 58 in the cruise condition, an in-flight test output from AND gate 105 is connected with OR gate 52 actuating the warning circuitry 54.

In carrying out the sequential warning, it is preferable that warning lights be observed carefully to distinguish the on-off-on sequence. The rapid changes in condition are difficult to discern with the audio signal.

Each of the warning condition detectors provides a warning of an unsafe condition with usually sufficient time for the pilot to pull up and avoid an accident. The warning boundary conditions are selected so that unnecessary warnings are minimized. While each of the detectors functions independently, the warning boundary conditions are so related that a warning is given for substantially all ground proximity related unsafe conditions of an aircraft.

I claim:

1. In an aircraft instrument for generating a warning to an operator in the event an aircraft descends below a predetermined altitude, except with flaps extended in a landing configuration, means inhibiting generation of a warning for enabling a warning free low altitude approach to a landing with the flaps up and landing gear down, comprising:
   means generating a signal representing the barometric rate of descent of the aircraft;
   means responsive to the barometric descent rate signal indicating a descent rate less than a predetermined value for generating a warning inhibit signal;
   means sensing the position of the aircraft landing gear; and
   means responsive to the landing gear being in a landing configuration to connect said warning inhibit signal with said warning generating instrument.

2. The aircraft instrument of claim 1 in which the predetermined barometric descent rate is a function of the altitude of the aircraft above the ground.

3. The aircraft instrument of claim 2 in which the maximum barometric descent rate at which a warning inhibit signal is generated, is directly related to the altitude of the aircraft above the ground.

4. The aircraft instrument of claim 3 in which a warning inhibit signal is generated for a barometric descent rate less than 1400 feet per minute at an altitude of 480 feet above the ground and 600 feet per minute at an altitude of 200 feet above the ground.

5. The aircraft instrument of claim 4 in which the connection of the means for connecting the warning inhibit signal with the warning generating instrument is maintained if the landing gear is retracted after being in landing configuration, and the connection is interrupted with the landing gear retracted and when the aircraft exceeds an altitude of the order of 700 feet.

6. The aircraft instrument of claim 1 in which the warning inhibit signal connecting means maintains a connection with the warning generating means if the landing gear is retracted after being in landing configuration.

7. The aircraft instrument of claim 6 in which the warning inhibit signal connecting means interrupts the connection with the warning generating means with the landing gear retracted, when the aircraft exceeds a predetermined altitude.

8. In an aircraft instrument for warning the operator in the event an aircraft descends below a predetermined altitude, except in a landing configuration, said instrument including means generating a signal representing the altitude of the aircraft above the ground, means generating a signal representing the position of aircraft flaps and means responsive to a combination of signals indicating altitude below a predetermined level and flaps in other than a landing position for actuating an operator warning, means for enabling a warning-free approach to a landing with the flaps in other than landing position and the landing gear down, comprising:
   means generating a signal representing the barometric rate of descent of the aircraft;
   means responsive to a barometric descent rate signal indicating a descent rate less than a predetermined value for generating a warning inhibit signal;
   means generating a signal representing the position of the aircraft landing gear; and
   means responsive to a signal indicating the landing gear in landing position to connect said warning inhibit signal with said warning actuating means.

9. The aircraft instrument of claim 8 in which the value of the altitude signal is directly related to the aircraft altitude below said predetermined altitude, and the value of said inhibit signal is inversely related to the descent rate of the aircraft, the warning-free enabling means including means for summing the altitude signal and the warning inhibit signal, whereby warning is inhibited with a greater descent rate at high altitude and a lesser descent rate at low altitude.

10. The aircraft instrument of claim 8 including an inhibit signal switch to connect the warning inhibit signal with the warning actuating means; and
    means for actuating said switch, responsive to a combination of signals indicating the landing gear in landing position and aircraft altitude below a predetermined level to close said switch.

11. The aircraft instrument of claim 10 in which said switch actuating means is responsive to a combination of signals indicating landing gear in nonlanding position and aircraft altitude above a predetermined level to open said switch.

* * * * *